C. BORNMANN.
PIN JOURNAL FOR PHOTOGRAPHIC CAMERAS.
APPLICATION FILED NOV. 14, 1911.
1,040,130.
Patented Oct. 1, 1912.
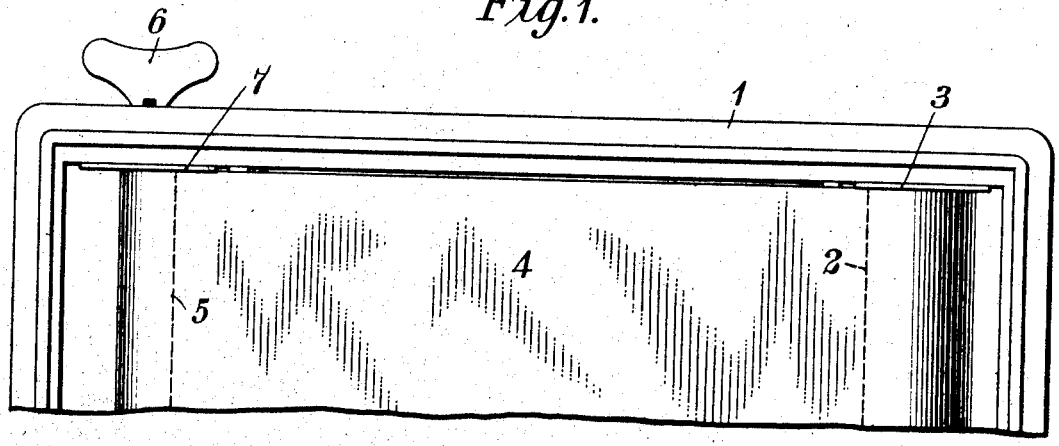
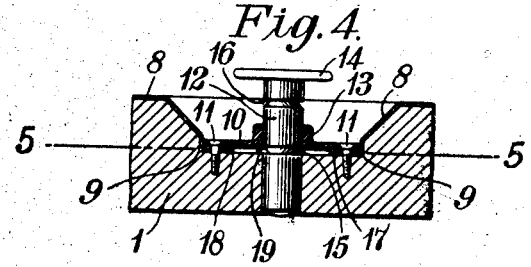
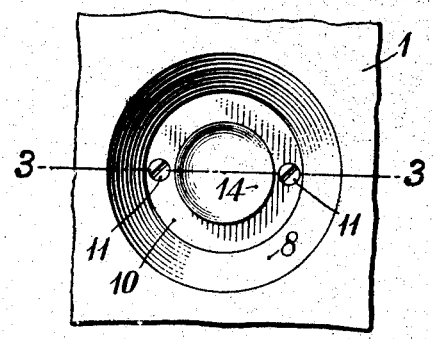
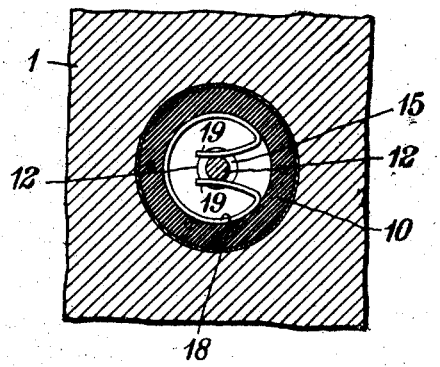
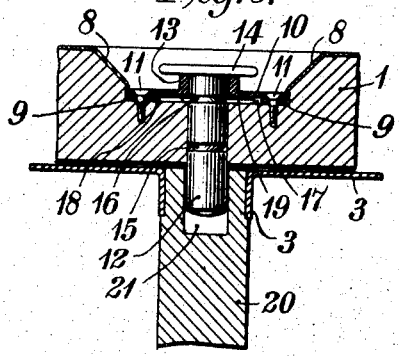
WITNESSES:
C. L. Belcher
F. M. Donsbach
INVENTOR
Carl Bornmann
BY
Phillips Abbott
his ATTORNEY.

UNITED STATES PATENT OFFICE.

CARL BORNMANN, OF BINGHAMTON, NEW YORK, ASSIGNOR TO ANSCO COMPANY, OF BINGHAMTON, NEW YORK.

PIN-JOURNAL FOR PHOTOGRAPHIC CAMERAS.

1,040,130.  Specification of Letters Patent.   Patented Oct. 1, 1912.

Application filed November 14, 1911. Serial No. 660,298.

*To all whom it may concern:*

Be it known that I, CARL BORNMANN, a citizen of the United States, and a resident of the city of Binghamton, county of Broome, State of New York, have invented a new and useful Improvement in Pin-Journals for Photographic Cameras, of which the following is a full, clear, and exact description.

Pin journals for cameras adapted to be retracted for the insertion of the spool have heretofore been made and used in various forms, but all constructions known to me have been defective in one or more particulars or attended with certain inconveniences in use.

It is the purpose of this present invention to provide a pin journal economical of manufacture, compact in structure, (so that it may be applied to small cameras and those in which the walls of the camera box are thin,) reliable in operation and so constructed that it is not liable to get out of order and the detachment and possible loss of the pin is rendered impossible. A special advantage is the fact that the device is so constructed that when retracted by proper manipulation, it will be locked in that position, so that it is not necessary longer to hold on to the pin, and yet may be quickly and easily released, whereupon it will automatically return to its normal position.

A peculiar feature of the construction described and claimed below is that the only manipulation required for operating the device is simply to pull it out, whereupon it will automatically lock in its retracted position and after the insertion of a spool to simply push it in to its former position, whereupon it will automatically lock in that position.

Referring to the accompanying drawings, Figure 1 illustrates a view of the interior of the roll holding chamber of the camera showing the stock spool and the receiving spool and the film extending from one to the other; Fig. 2 illustrates a plan view or an elevation, depending upon the position of the camera, showing the outwardly presented parts embodied in the invention; Fig. 3 illustrates a sectional view of that which is shown in Fig. 2, taken on the line 3—3 thereof and showing the pin journal and coacting parts in the inwardly projected position; Fig. 4 illustrates a view the same as Fig. 3, except that the pin journal and coacting parts are shown when the former is withdrawn; Fig. 5 illustrates a plan view of that which is shown in Fig. 4 taken on the line 5—5 thereof. Figs. 2, 3, 4 and 5 are considerably enlarged as compared with Fig. 1.

In the drawings, 1 represents the sideboard of the camera box, 2 the stockspool, 3 one of the flanges thereof, 4 the film, 5 the receiving spool, 6 the winding key therefor, 7 one of the flanges of the receiving spool, 8 the leather or other material which usually covers the camera box. As shown it projects downwardly into a saucer shaped recess within which the outwardly exposed parts of the pin journal are located, so that they may normally be below the plane of the sideboard of the camera box and thus out of the way and not liable to injury. The lower part of the recess in the sideboard of the camera box is made square in outline as shown and the edge 9, 9, of the leather or other covering may be carried down into this squared part or bottom of the recess, so as to be securely held by the plate 10 of the journal mechanism, as illustrated best in Figs. 3 and 4. The plate 10 is firmly held in the bottom of the recess by two screws 11, 11, or in any other preferred manner.

The pin journal 12 is made in the form shown and is adapted to slide through an opening made through a central hub 13 on the plate 10. A cap plate 14 is attached to the outer end of the pin 12 which can readily be laid hold of by the operator for the proper manipulation of the pin. The pin has two circular grooves 15, and 16, cut in it, each having one vertical side and each one inclined side and on the under side of the plate 10 there is provided a recess 17 within which a spring 18 (best seen in Fig. 5) is located. The ends 19, 19, of this spring are in the example shown turned inwardly and engage one or the other of the grooves 15 or 16 in the pin journal, depending upon the position of that pin. This spring is firmly held in place within the recess 17 provided for it in the plate 10 because that plate is firmly and rigidly held by the screws 11, 11, which confine it. The length of the pin is such that when it is retracted as shown in Fig. 4, its innermost extremity will be flush or substantially flush with the inner surface of the sideboard of the camera box.

In Fig. 3 I illustrate a cartridge in position relative to the pin journal, 3 representing the flange of the spool, the same as before, and 20 the spindle, usually of wood, of the spool and 21 the hole in the end of the spindle made for the reception of the pin journal.

The operation is as follows: When a cartridge spool is in position as illustrated in Fig. 3, the pin journal 12 is in its innermost position engaging with the hole 21 in the end of the spindle of the spool and the ends 19 of the spring enter into the upper groove 16 in the pin and securely hold it in its then position. When it is desired to remove the spool, the operator catches hold of the head 14 of the pin and pulling it outwardly, causes the ends 19 of the spring to ride up the inclined side of the groove 16 onto the cylindrical part of the pin between the two grooves and as the pin is drawn outwardly when the other groove 15 registers with the ends of the spring, they at once move into that groove and again hold or lock the pin in its projected or outward position. Thereupon the end of the pin having been removed from the hole in the end of the spindle of the spool and into a position substantially flush with the inner surface of the sideboard of the camera box, the spool may be readily removed and upon insertion of another spool pressure exerted by the thumb of the operator, or otherwise, upon the outer head or plate 14 of the pin, will cause the ends 19 of the spring in a similar manner to ride up the inclined side of the groove 15, thus permitting the pin to be moved inwardly and enter the hole in the spindle of the spool.

It will be noticed that one side of each of the grooves is made angular or inclined, so that the ends of the spring will readily, under the pressure exerted, ride up such incline and be removed from the groove, whereas the opposite sides of each of the grooves is made at right angles to the axis of the pin, so that it presents a square shoulder against which the spring will act as a lock to confine the pin either in its retracted or inwardly projected position, as the case may be.

It will be obvious to those who are familiar with such matters that changes may be made in the details of construction of the parts without departing from the essentials of the invention. For example, other forms of spring may be employed and they may otherwise engage with the pin, although I prefer the form shown. Also the grooves in the pin may be of different shape from that illustrated and the pin itself may be made of such special shape on its inner end as will best engage with such special construction of the spool as may be desired. I therefore do not limit myself to the details above shown and described as they represent one form only in which the invention may be embodied.

I claim:

A pin journal for cameras embodying a plate having a centrally located and outwardly projecting hollow hub, a pin adapted to slide through the hollow hub and having suitably spaced circumferential grooves, each having one vertical side and one inclined side, an enlarged head adapted to act as a handle for the manipulation of the pin and its under surface adapted to rest upon the outer end of the hollow hub and close the hole through it and a spring housed within a recess in the plate and adapted to enter the grooves in the pin, the grooves being so located that when the pin is projected, the spring will hold it with its inner end substantially flush with the inside of the camera and when the pin is retracted the spring will hold the under surface of the head securely against the outer end of the hub, thus closing and making light tight the hole through the hub.

In testimony whereof I have signed my name to this specification in the presence of two subscribing witnesses.

CARL BORNMANN.

Witnesses:
Geo. W. Topliff,
A. Deichelmann.